(12) United States Patent
Cheung et al.

(10) Patent No.: US 8,317,910 B2
(45) Date of Patent: Nov. 27, 2012

(54) IMMERSION PLATINUM PLATING SOLUTION

(75) Inventors: Robin Cheung, Cupertino, CA (US);
Wen Zhong Kong, Newark, CA (US)

(73) Assignee: Unity Semiconductor Corporation, Sunnyvale, CA (US)

( * ) Notice: Subject to any disclaimer, the term of this patent is extended or adjusted under 35 U.S.C. 154(b) by 367 days.

(21) Appl. No.: 12/661,678

(22) Filed: Mar. 22, 2010

(65) Prior Publication Data

US 2011/0229734 A1 Sep. 22, 2011

(51) Int. Cl.
*C23C 18/42* (2006.01)
(52) U.S. Cl. ...................................... 106/1.28
(58) Field of Classification Search ............... 106/1.28
See application file for complete search history.

(56) References Cited

U.S. PATENT DOCUMENTS

| | | | | |
|---|---|---|---|---|
| 3,562,911 A * | 2/1971 | Walter et al. | ............ | 106/1.28 |
| 4,214,017 A * | 7/1980 | Laitinen et al. | ............ | 106/1.28 |
| 6,251,249 B1 * | 6/2001 | Chevalier et al. | ............ | 205/80 |
| 6,391,477 B1 * | 5/2002 | Koslov et al. | ............ | 106/1.28 |
| 6,506,314 B1 * | 1/2003 | Whitney et al. | ............ | 216/100 |
| 6,706,420 B1 * | 3/2004 | Kozlov et al. | ............ | 106/1.28 |
| 7,476,305 B2 | 1/2009 | Chopra | | |
| 7,589,043 B2 | 9/2009 | Yoo et al. | | |
| 2008/0269046 A1 | 10/2008 | Minoshima et al. | | |
| 2009/0220835 A1 | 9/2009 | Yushan et al. | | |
| 2010/0055422 A1 * | 3/2010 | Kong et al. | ............ | 428/209 |
| 2010/0098863 A1 * | 4/2010 | O'Keefe et al. | ............ | 427/307 |
| 2010/0291312 A1 * | 11/2010 | Murakami et al. | ............ | 427/443.1 |

FOREIGN PATENT DOCUMENTS

EP 1 808 920 A1 7/1920
WO WO 2009/054420 A1 * 4/2009

* cited by examiner

*Primary Examiner* — Helene Klemanski
(74) *Attorney, Agent, or Firm* — Stolowitz Ford Cowger LLP

(57) ABSTRACT

A platinum plating solution for immersion plating a continuous film of platinum on a metal structure. The immersion platinum plating solution is free of a reducing agent. The plating process does not require electricity (e.g., electrical current) and does not require electrodes (e.g., anode and/or cathode). The solution includes a platinum source and a complexing agent including Oxalic Acid. The solution enables immersion plating of platinum onto a metal surface, a metal substrate, or a structure of which at least a portion is a metal. The resulting platinum plating comprises a continuous thin film layer of platinum having a thickness not exceeding 300 Å. The solution can be used for plating articles including but not limited to jewelry, medical devices, electronic structures, microelectronics structures, MEMS structures, nano-sized or smaller structures, structures used for chemical and/or catalytic reactions (e.g., catalytic converters), and irregularly shaped metal surfaces.

13 Claims, 3 Drawing Sheets

US 8,317,910 B2

IMMERSION PLATINUM PLATING SOLUTION

FIELD OF THE INVENTION

This invention relates to immersion plating of platinum onto a metal surface, including for example immersion plating of a continuous thin film layer of platinum on a metal surface.

BACKGROUND OF THE INVENTION

Platinum is a precious metal for which there are many uses, both industrial and non-industrial. Many of these applications take the form of platinum plating, where platinum is plated on a metal surface or substrate. For example, the automotive industry uses platinum plating in the production of catalytic converters. Platinum plating is also used to coat medical instruments and devices, such as catheters or electrical contacts on medical devices and surgical instruments. Platinum is also used in the electronics and electrical industries for electrical contacts. Platinum coated electrodes are also used in the processes for refining oil and manufacturing fertilizers and explosives. As a final example, platinum is used in the jewelry industry to plate less expensive metals. Platinum has a high luster and is resistant to tarnishing and oxidation. Further, platinum resists oxidation and does not oxidize at high temperatures such as those encountered in hot exhaust gases from combustion engines and the like. Platinum is also hypoallergenic.

However, platinum is very expensive. Therefore, any plating process preferably will minimize the waste of platinum. For example, it is preferable that a plating process deposit platinum only on the target surface and not on other surfaces. The deposition of platinum onto a container holding the plating solution, onto jigs or fixtures holding the object to be plated (e.g., a workpiece), or onto electrodes or other equipment used in the plating process, is wasted platinum. It is also preferable that platinum be deposited to the minimum desired thickness. Overplating results in a platinum plating that is thicker than required, which means that more platinum was used in the plating process as compared to a thinner but still adequate plating. Overplating and wasted platinum not only require more platinum to be used than is necessary, but are also reflected in the cost of the article(s) being plated. Ideally, only the minimal amount of platinum needed would be used for plating articles, thereby reducing platinum costs and the platinum related costs of the article(s) being plated.

There are two conventional approaches to platinum plating: electroplating and electroless plating. In electroplating, two electrodes are immersed in a solution of electrolyte containing platinum ions. The voltage difference between and anode and cathode creates an electric field (e.g., an electrical current) in the solution, which facilitates the plating of a film of platinum onto the object. The object being plated may serve as one of the electrodes, for example. However, electroplating suffers from several drawbacks. One drawback is that the process is directional. Therefore, it is more difficult to evenly plate irregularly shaped objects. Depending on the physical setup, the platinum may also coat the electrodes or fixtures, resulting in more waste.

In contrast, electroless plating does not use electrodes but uses a reducing agent to facilitate a chemical reaction for plating a metal substrate. Typically, the metal substrate to be plated is submerged in an electroless plating solution that contains both platinum ions and a reducing agent. The platinum ions are reduced to elemental platinum that plates onto the metal substrate. Electroless plating also has disadvantages, some due to the use of the reducing agent. For example, the reducing agent is active regardless of whether a metal substrate is submerged in the plating solution, because platinum is always present in the solution. Thus, the chemical reaction in the electroless plating solution continues even if no metal substrate is present. The solution will consume itself or "plate out", requiring the replenishment of more chemicals and platinum and driving up the cost. Not only does electroless platinum plating drive up the cost, more importantly, the "plating out" of the bath means once the platinum is totally consumed, one cannot plate any more. The bath is basically dead. Bath stability is another issue that affects the cost and efficiency of electroless plating. As the bath decomposes, expensive platinum is wasted and the bath and associated tools covered by the bath are contaminated with platinum residue. The platinum residue is difficult to remove.

There are continuing efforts to improve platinum plating technology.

BRIEF DESCRIPTION OF THE DRAWINGS

Various embodiments of the invention are disclosed in the following detailed description and the accompanying drawings.

Although the above-described drawings depict various examples of the invention, the invention is not limited by the depicted examples. It is to be understood that the drawings are not necessarily to scale.

DETAILED DESCRIPTION

Aspects of the invention provide a process for plating a metal surface (or substrate) with a continuous film of platinum using immersion plating. For purposes of this disclosure, the terms immersion plating and electroless plating are meant to be mutually exclusive. Electroless plating uses a plating solution that contains a reducing agent. Immersion plating uses a plating solution that is free of a reducing agent. One advantage of immersion plating is that the plating solution typically is more stable and lasts longer because there is no reducing agent. In contrast, in electroless plating, the plating solution "plates out" and has to be replenished due to the presence of the reducing agent, even when no metal substrate is submerged in the plating solution.

An aqueous immersion platinum plating solution is formed by combining water, a platinum source, a complexing agent and possibly various other additives. The platinum source provides the platinum for the plating. In some applications, adding water may not be necessary if the platinum source and/or complexing agent already include a sufficient volume of water. Platinum sources can be classified according to their oxidation state, with Pt (II) sources and Pt (IV) sources being the more common. Examples of Pt (II) sources include but are not limited to the following: Sodium Tetrachloroplatinate $Na_2PtCl_4$; Diammonium Tetrachloroplatinate $(NH_4)_2[PtCl_4]$; Potassium Tetrachloroplatinate $K_2PtCl_4$; Ammonium Tetrachloroplatinate $(NH_4)_2PtCl_4$; and Diammine Dinitritoplatinum $Pt(NH_3)_2(NO_2)_2$. Examples of Pt (IV) sources include but are not limited to the following: Chloroplatinic Acid $H_2PtCl_6$; Sodium Hexachloroplatinate $Na_2PtCl_6$; Potassium Hexachloroplatinate $K_2PtCl_6$, and Ammonium Hexachloroplatinate $(NH_4)_2PtCl_6$.

The complexing agent is used to control the reaction rate of displacement of platinum. In one embodiment, Oxalic Acid $(H_2C_2O_4)$ is used as the main complexing agent. Examples of other complexing agents that can be combined with Oxalic Acid include but are not limited to one or more of the following compounds: Citric Acid; Acetic Acid $(CH_3COOH)$; Sulfonic Acid; Thiourea $(CSN_2H_4$ or $(NH_2)_2CS)$; Ethylenediamine (EDA); Monoethanolamine (MEA); Ethylediaminetetraacetic Acid (EDTA); Prydine $(C_5H_5N)$; Hydroxylamine $(NH_2OH)$; Acetylcysteine; Acetylacetone, and Glycine $(NH_2CH_2COOH)$. These complexing agents when combined with Oxalic Acid can be used to improve the quality of the deposited platinum film.

Figure 1:
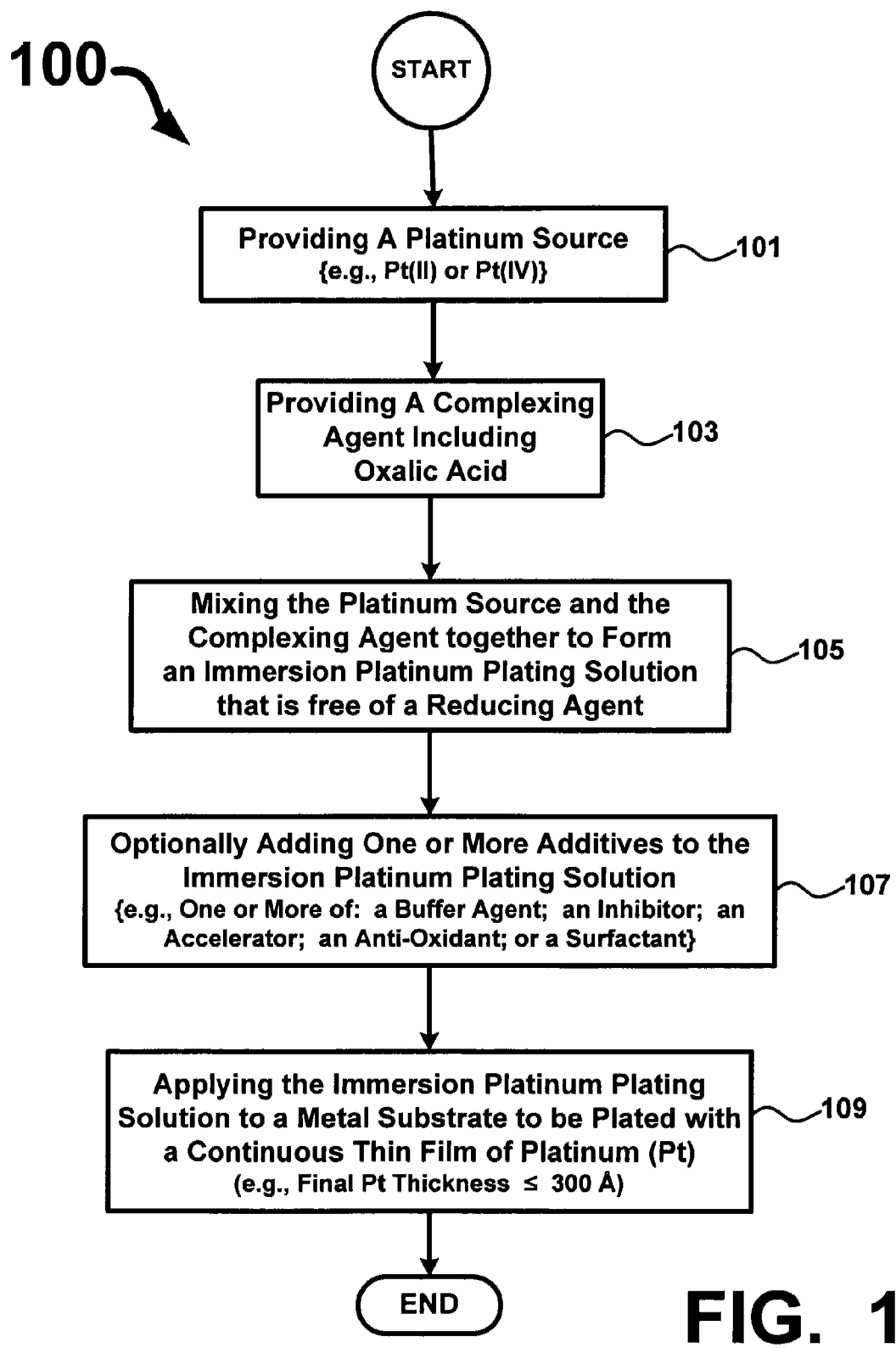
FIG. 1 depicts an example flow diagram of a method for an immersion platinum plating solution.

FIG. 1 depicts a flow diagram 100 of one example method for an immersion platinum plating solution. At a stage 101, a platinum plating source (e.g., an aqueous solution of Pt (II) or Pt (IV)) is provided. At a stage 103, a complexing agent (e.g., an aqueous solution of Oxalic Acid $(H_2C_2O_4)$ is provided. At a stage 105, the platinum source and the complexing agent are mixed (e.g., they are added to each other) to form an immersion platinum plating solution. Any one or more of the stages 101, 103, and 105 can optionally include adding water (e.g., a purified water or deionized water) to form the immersion platinum plating solution. At a stage 107, one or more additives can optionally be added to the immersion platinum plating solution as will be described in greater detail below. At a stage 109, the immersion platinum plating solution, with or without the additives of stage 107, can optionally be applied to a metal substrate to be plated with the immersion platinum plating solution. As will be described below, the applying 109 can be accomplished in a variety of ways, including submerging an article to be plated in the solution and spraying the solution on the article to be plated. The applying can be performed under environmental conditions that are application dependent such as at a controlled temperature, pressure, plating time, solution pH, and/or a relative movement between the solution and the article(s) being plated, for example. Optionally, after the stage 109, the article that was plated can be rinsed off (not shown) using an appropriate solution such as purified or deionized water, for example. Moreover, any time during or after the stage 109, the article(s) being plated can be inspected for plating quality as described below. The immersion plating of an article at the stage 109 occurs without the application of electricity (e.g., electrical current and without the use of electrodes (e.g., anodes and/or cathodes).

One can use single or multiple complexing agents. The main purpose is to control the stability and deposition rate of platinum film. Grain size control is another important factor. In one embodiment, the platinum source is a Pt (II) source and the complexing agent is Oxalic Acid. The Pt (II) source has a molar concentration of not less than 0.5 mM, and preferably has a molar concentration of between about 1 mM and about 50 mM. Too low concentrations of the platinum source can result in a low quality platinum film. Higher concentrations can become expensive due to the greater quantity of platinum required. The molar concentration of the platinum source can be selected to balance factors such as the cost of the bath (e.g., cost due to the amount of platinum in the platinum source), the speed of platinum deposition, and the desired quality of the continuous platinum film. The Oxalic Acid preferably has a molar concentration that is between 1× and 100× that of the platinum source. Again, too low concentrations of the Oxalic Acid can result in a low platinum film quality or incomplete platinum plating (e.g., a non-continuous platinum film). Higher concentrations of Oxalic Acid can result in wasted chemicals. The concentration of Oxalic Acid can be selected to control deposition rate of the platinum, platinum film quality, and grain size of the platinum film.

High quality immersion platinum platings can often be characterized by a high platinum particle density and a small grain size that produces a continuous thin film platinum plating on the metal substrate. In contrast, low quality platings can often be characterized by a plating that is not continuous due to large grain size and/or low particle density. Visual inspection of the plated article (e.g., using the unaided eye or magnifying devices such as a magnifying glass, a microscope, a SEM, a TEM, etc.) can be used to determine the quality of the plating. A high quality plating will appear bright and shiny to the eye and will have a small grain size when viewed using a magnifying device such as a microscope, SEM, or the like. On the other hand, a low quality plating will not have the luster (i.e., bright, shiny, reflective) of a high quality film and visual inspection will typically reveal large grain size and low platinum particle density.

In that the complexing agent is an acid, the overall immersion platinum plating solution in this example is also acidic. A buffer agent can be used to maintain the overall pH of the solution, preferably at a pH between 1 and 6, and more preferably between 2 and 5. Examples of buffer agents include but are not limited to Ammonium Chloride $(NH_4Cl)$, Citric Acid, and Acetic Acid. The temperature of the immersion platinum plating solution preferably is maintained in a range from about 10° C. to about 50° C. during contact with the metal substrate being plated. For example, the immersion platinum plating solution can be at room temperature (e.g., approximately 20° C. to 25° C.). The pH and temperature can be selected to control plating rate, grain size, and quality of the platinum film.

The metal substrate can be various types of metal. Examples of metals include but are not limited to copper Cu, tin Sn, nickel Ni, ruthenium Ru, titanium Ti, aluminum Al, tantalum Ta, palladium Pd, rhodium Rh, iridium Ir, silver Ag, gold Au, cobalt Co, and alloys of those metals. The substrate may also be a metal alloy, rather than a pure metal.

The immersion platinum plating solution may also include additional additives including but not limited to the following: an inhibitor and/or accelerator to control the rate of the plating reaction; a surfactant; and an anti-oxidant, for example. Examples of inhibitors include but are not limited to Benzotriazole (BTA). BTA and Thiourea are more commonly used for corrosion resistance. Examples of accelerators include but are not limited to Hydroxylamine $(NH_2OH—HCl)$ and Sulfonic Acid. Examples of surfactants include but are not limited to Triton X-100, Cetyltrimethylammonium Bromide (CTAB), and Polyethylene Glycol (PEG). Examples of anti-oxidant include but are not limited to Riboflavin (Vitamin B2), Ascorbic Acid (Vitamin C), Oxalic Acid itself, and Hydroylamine.

Continuing the above example, an immersion platinum plating solution uses BTA as an inhibitor with a concentration of between about 10 mg/L and about 100 mg/L, hydroxylamine as an accelerator with a molar concentration that is between 1× and 20× the molar concentration of the platinum source, Triton X-100 as a surfactant with a concentration of between about 10 ppm and about 100 ppm, and an anti-oxidant with a molar concentration that is between 1× and 20× the molar concentration of the platinum source.

Note that the various additives described above do not have to be separate components. It is possible for a single component to play the role of more than one additive. For example, Oxalic Acid can function as both a complexing agent and as an accelerator. As another example, Oxalic Acid can function as both a complexing agent and as an anti-oxidant operative to prevent the Pt (II) from oxidizing into Pt (IV).

One advantage of this immersion plating is that it works, as will be described in greater detail below. The inventors do not know of any successful efforts to immersion plate platinum in a continuous thin film. Another advantage is that the plating can be controlled to provide relatively thin platinum plating, for example final thicknesses of 300 Angstroms, 200 Angstroms, or 50 Angstroms or less, but still as a continuous film. Thinner platinum plating consumes less platinum, thus saving on platinum costs and cost of the plated article.

In one approach, the final thickness is controlled by contact time between the article being plated and the immersion platinum plating solution. The immersion platinum plating solution contacts the metal substrate (e.g., the workpiece to be plated) and, when the desired thickness is achieved, the contact is broken to prevent further plating. In a different approach, the final thickness is controlled by the chemistry of the plating solution.

Contact between the immersion platinum plating solution and the metal surface/substrate can be achieved in many different ways. In one approach, the plating solution is contained in a bath, and the metal substrate is dipped (e.g., submerged) into the bath. A structure (e.g., a tank) containing a bath of the immersion platinum plating solution preferably is not reactive (e.g., made from a non-metal material) and the bath preferably is temperature controlled. Examples of suitable materials include but are not limited to plastic, Teflon®, PVDF, PEFA, quartz glass, Pyrex®, and other types of glass. The solution and substrate may also be agitated relative to each other, for example by agitating the solution (e.g., mechanically or by ultrasound) or by moving the substrate. In a variation, the metal substrate may be moved through the bath, for example on a conveyor belt (which itself may or may not move through the bath).

In some applications, it may be desirable to prevent relative movement between the article being plated and the solution. For small batches (e.g., plating a ring), the plating can be performed in a glass beaker or flask, for example. As another example, if a flask is used, a stopper or the like can be used to seal the mouth of the flask during plating. The flask or beaker can be placed on a temperature controlled hot plate or other heat source to set the temperature of the immersion platinum plating solution. A magnetic stirrer can be used to circulate the immersion platinum plating solution over the article being plated. A combination hot plate and magnetic stirrer can be used to provide both temperature control and relative motion between the article being plated and the immersion platinum plating solution. Preferably, the magnetic stir bar used with the magnetic stirrer is encased in a non-metallic material (e.g., a plastic encapsulated magnet) so that the solution will not plate onto the stir bar.

In another approach, the immersion platinum plating solution can be sprayed (e.g., as a mist, a vapor, or a stream) onto the metal surface to make the contact between the immersion platinum plating solution and the metal surface/substrate. The solution is then washed off (e.g., contact is broken) at the appropriate time. In some applications, it may be desirable to have the metal surface facing upwards. For example, in certain types of semiconductor processing, it may be desirable to deposit (i.e., plate) platinum onto certain areas (e.g., microelectronic structures) of a partially or fully processed semiconductor wafer, and it may be desirable to do this with the wafer facing upwards rather than downwards or sideways. In one approach, the wafer is positioned facing upwards and the immersion platinum plating solution is then deposited onto the upwards-facing wafer. The solution can be distributed across the wafer by spinning the wafer. The solution can be removed by washing it off, or by spinning the wafer at a high speed. For example, water (e.g., purified water or DI water) can be used to rinse the solution off of the plated article. In other applications, the wafer can be submerged in the immersion platinum plating solution in an upward facing position. In other applications, the immersion platinum plating solution can be sprayed onto the wafer.

In yet other applications, the wafer can be facing downward, sideways, or in some degree of vertical orientation and then submerged in the immersion platinum plating solution or the solution can be applied by spraying or some other form of application. Structures on the wafer that are not to be immersion plated can be protected or covered by a non-metallic material such as an oxide or nitride, for example. Structures to be immersion plated can be part of an electrical circuit, an electrical contact, a mechanical component (e.g., a MEMS structure), or a nano-size structure, for example.

Another advantage of immersion plating is that it is generally non-directional. Thus, irregularly shaped substrates can be successfully plated because the immersion platinum plating solution typically has no preferred direction for its plating action relative to the article being plated. Jewelry and catalytic converters are two examples. The immersion platinum plating solution can penetrate small orifices, crevices, features, and the like in a structure such as the micro ducts in a catalytic converter substrate. The immersion platinum plating solution can be used to immersion plate platinum on a metal surface to form a catalytic surface for a catalytic reaction between the platinum and another chemical compound (e.g., as in the micro ducts of a catalytic converter used with combustion engines). Fine features, intricate details, and complex surface shapes in jewelry can be plated with a continuous thin film of platinum using the immersion platinum plating solution.

Immersion platinum plating is further explained by the following examples. These are examples and are not intended to limit the scope of the invention.

Example 1

The following immersion platinum plating solution was created: 5 mM $Na_2PtCl_4$ as the platinum source, 5-200 mM (preferably 15-160 mM, and more preferably 100-120 mM) Oxalic Acid as a complexing agent, and 0-50 mg/L BTA as an inhibitor. As was described above, the Oxalic Acid can serve multiple functions in the immersion platinum plating solution. In this example, the Oxalic Acid also serves as an accelerator. The solution was maintained at a pH in a range of 1.8 to 2.5 (preferably 2.0 to 2.2) and at a temperature of approximately 40° C. A tin (Sn) substrate was immersed in the solution for 60 sec. The resulting platinum plating was bright and shiny.

The bright and shiny appearance of the platinum plated substrate is one measure that the platinum plating of the tin substrate was a continuous thin film. The plated tin substrate also passed a simple nitric acid ($HNO_3$) test designed to determine if the thin platinum film was continuous and therefore operative to protect the underlying tin substrate from being chemically attacked by the nitric acid. If the plated platinum film were not continuous, then the nitric acid would have attacked those portions of the tin substrate that were not plated with the corrosion resistant platinum. The nitric acid test did not reveal any signs of corrosion of the underlying tin substrate. Consequently, there were no discontinuities in the platinum plating and the absence of discontinuities is indicative of a continuous thin film layer of immersion plated platinum on a tin substrate. The thickness of the plated platinum film was about 30 Angstroms as measured by a transmission electron microscope (TEM).

Example 2

The bath described in Example 1 above was used again for plating one week later. The performance of the plating solution was the same after two plating iterations. Subsequently, the same bath was used for three consecutive weeks and the results were the same after a total of five plating iterations using the same bath. That is, the bath was not replenished or refreshed with new chemicals or solutions. The repeatability of the results indicated that the bath is chemically stable over time.

Example 3

The following immersion platinum plating solution was created: 5 mM $H_2PtCl_6$ as the platinum source, 10 mM Oxalic Acid as a complexing agent, and 50 mg/L BTA as an inhibitor, and a pH in a range from about 2.5 to about 3. A substrate of electrolessly deposited nickel (Ni) was immersed in the immersion platinum plating solution for about 10 minutes at room temperature. The resulting platinum plating was bright and shiny, and indicative of a continuous thin film platinum plating on the Ni substrate.

One advantage of the immersion platinum plating solution is that it can be used for plating items in small batches of one or more items and it can be used for plating items in large production quantities. A single item or a batch of items can be plated using the solution. As a first example, a small jewelry shop can use the immersion platinum plating solution to plate a metal surface of a single article of jewelry or a few articles of jewelry at the same time. The immersion platinum plating solution can then be stored and subsequently used to plate other articles of jewelry at a future time. As a second example, the immersion platinum plating solution can be used in a manufacturing or production environment where large quantities of items are immersion plated at the same time (e.g., a core element of a catalytic converter, contacts in an electrical component, a medical device or component of a medical device, etc.).

Actual plating apparatus will be application specific and will depend on many factors, such as the quantity of items to be immersion plated, plating time, plating temperature, processing environment, composition of the immersion platinum plating solution, recycling and/or replenishing one or more components of the immersion platinum plating solution if necessary, removal of contamination from the immersion platinum plating solution that may be caused by the process and/or the item(s) being plated, agitation of the solution or relative movement between the solution and the article(s) being plated, just to name a few.

Figure 2:
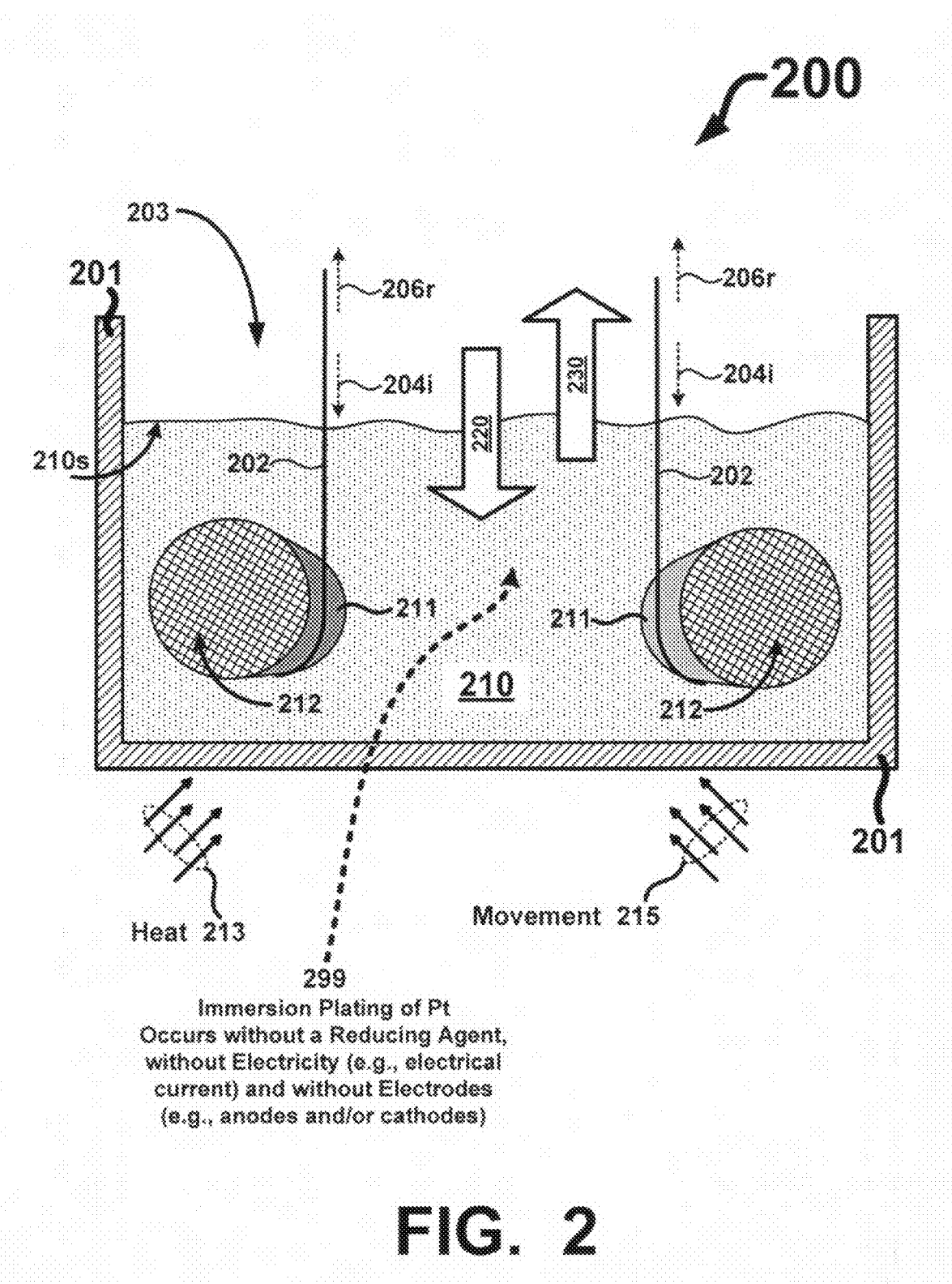
FIG. 2 depicts a cross-sectional view of an example of an immersion platinum plating apparatus and an article to be plated using an immersion platinum plating solution that is free of a reducing agent and the plating process does not require electricity and electrodes.

In FIG. 2, a configuration 200 depicts one example of how an article(s) can be plated with a thin continuous film of platinum using the immersion platinum plating solution described above. Here, a non-metallic structure 201 (e.g., a tank or other type of container or vessel) is filled with the immersion platinum plating solution 210 to a depth sufficient to cover the articles to be plated. The structure 210 can be a sealed container (not shown) or can have an opening 203 as depicted. The solution 210 and articles to be plated can be positioned in the structure 201 via the opening 203. A sealed container may be desirable to prevent contamination of the solution 210 and/or the article(s) to be plated or to the protect workers or the environment from the solution 210. A portion or all of an article to be immersion plated can be positioned in the solution 210. For example, the entire article can be positioned below a surface 210s of the solution 210 or only a portion of the article to be immersion plated can be positioned below the surface 210s (e.g., the portion having the metal surface(s) to be immersion plated) with a remaining portion positioned above the surface 210s.

Workpiece holders 202 can be used to insert 204i and remove 206r a workpiece 211 into (e.g., make contact) and out (e.g., break contact) of the solution 210. Although the workpiece 211 can be any object for which at least a portion comprises a metal surface to be plated, in the example of FIG. 2, the workpiece 211 comprises a ceramic block for a catalytic converter and includes a lattice work or honeycomb structure of micro ducts 212 that are to be plated using the immersion platinum plating solution 210 to plate Pt onto the surfaces of the micro ducts 212 to form a substrate of platinum (Pt) and rhodium (Rh) or platinum (Pt) and palladium (Pd). In some applications, the Pt can be plated onto pellets for a catalytic converter instead of the micro ducts of a ceramic substrate.

Heat 213 can be applied to the solution 210 to maintain the solution 210 at a desired temperature during the immersion plating process. A closed loop monitoring system can be used to set the temperature of the solution to a desired set point (e.g., a temperature sensor coupled with a process controller). Movement 215 (e.g., motion, vibration, shaking, agitation, etc.) can be imparted to the structure 201, the solution 210, the workpiece 211, or any combination of the foregoing. In some applications, both heat 213 and movement 215 can be applied. The solution 210 can be added 220 and/or removed 230 during the immersion plating process to accomplish any number of process objectives, including but not limited to filling the structure 201 with the solution 210, circulating the solution 210 during the plating process, filtering contaminants from the solution 210, recycling the solution 210, cooling or heating the solution 210, imparting movement 215 to the solution 210, re-conditioning the solution 210, adding the aforementioned additives to the solution 210, just to name a few.

The configuration 200 can be adapted to a production environment where large numbers of articles are to be plated using the solution 210. Although only two articles 211 are depicted, the configuration 200 can be expanded by enlarging the volume of the structure 201, the workpiece holders 202 can be increased or replaced by some other apparatus for bringing the articles 211 into contact with the solution 210, such as a conveyor apparatus or the like, preferably made from a non-metallic material, for example.

The articles 211 to be plated will be specific to each application and the present invention is not limited to the articles 211 depicted in FIG. 2. For example, the articles to be plated can comprise any metal structure or substrate upon which it is desired to immersion plate a continuous thin film layer of platinum. A timer, process controller, or other apparatus can be used to control the duration of time the articles 211 and the solution 210 are in contact with one another. For example, after a predetermined immersion plating time has elapsed, an apparatus (not shown) connected with workpiece holders 202 can remove the articles 211 from the solution 210. Subsequently, the apparatus can move the articles 211 to a rinse station for rinsing the solution 210 off the articles 211.

Figure 3:
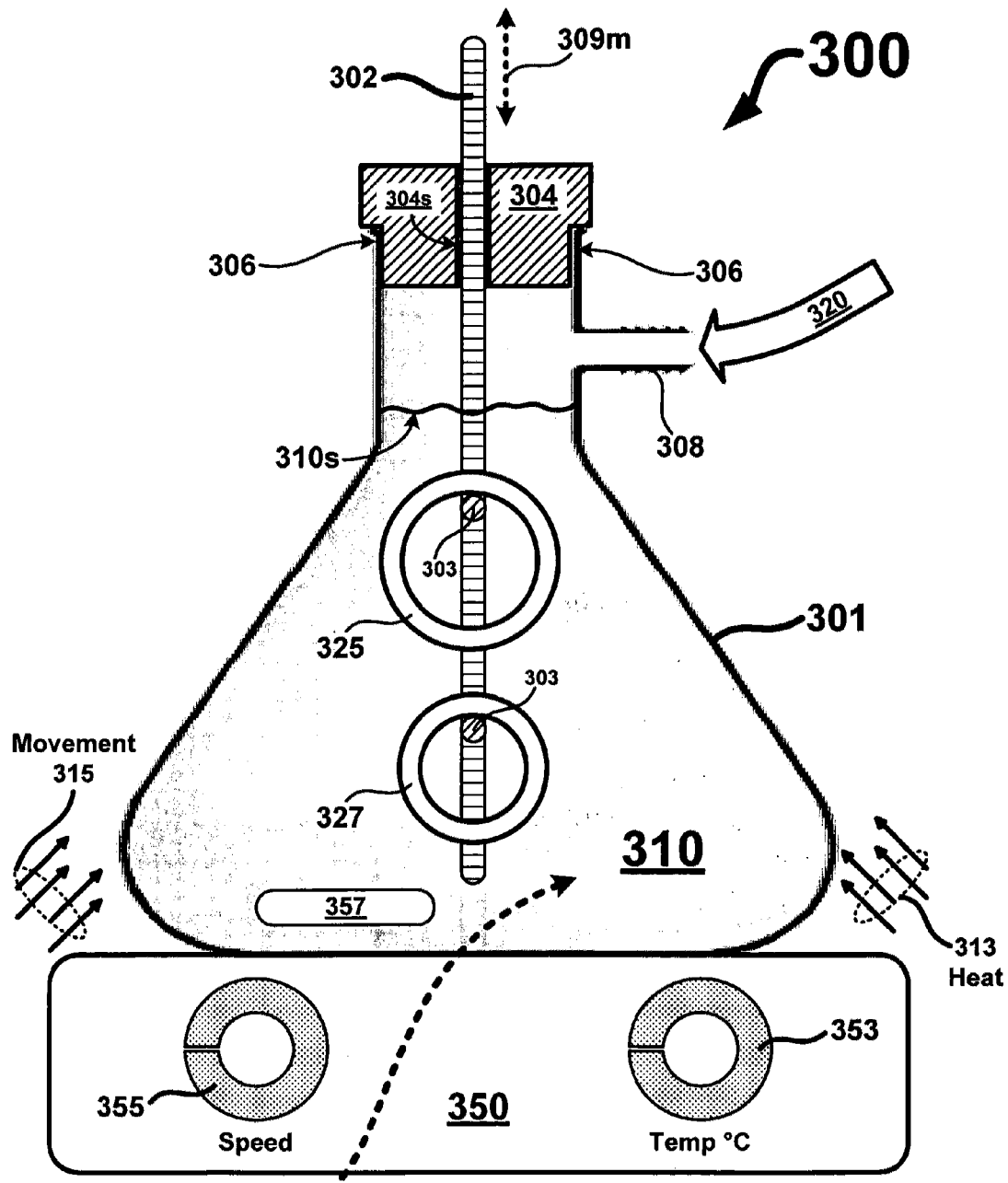
FIG. 3 depicts a cross-sectional view of another example of an immersion platinum plating apparatus and an article to be plated using an immersion platinum plating solution that is free of a reducing agent and the plating process does not require electricity and electrodes.

In FIG. 3, a configuration 300 depicts one example of immersion plating that can be used for small production quantities. Here flask 301 is filled to the desired level with the immersion platinum plating solution 310 via a neck 306 or a nipple 308 of the flask 301. A stopper 304 can be used to seal the neck 306 and can include an opening 304s through which a workpiece holder 302 can be inserted and optionally moved in a direction depicted by dashed arrow 309m. Although not depicted, nipple 308 can also be sealed with a stopper. Workpiece holder 302 includes two structures 303 adapted to support the workpieces 325 and 327 during the immersion plating process. Workpieces 325 and 327 comprise two wedding bands of different sizes that are to be plated with a continuous thin film layer of platinum. Workpieces 325 and 327 are positioned below a surface 310s of the solution 310 under predetermined conditions (e.g., solution 310 composition, immersion time, temperature, vibration or motion) to immersion plate a thin film continuous layer of platinum on exposed metal surfaces of the workpieces 325 and 327. Other articles of jewelry including but not limited to ear rings, necklaces, rings, components of a timepiece, etc., can be immersion plated in small quantities using the configuration 300.

For large production quantities, the configuration 200 of FIG. 2 can be used to immersion plate a larger quantity of articles. Optionally, the flask 301 can be positioned on an apparatus 350 configured to apply heat 313 and/or movement 315 to the immersion platinum plating solution 310. Apparatus 350 can be a combination magnetic stirrer and hot plate with one control 353 for setting a desired temperature for the solution 310 and another control 355 for setting an agitation speed for a magnetic stir bar 357. Preferably, stir bar 357 is a magnet encapsulated in a non-metallic material such as a plastic, ceramic, glass, Teflon, or PVDF, for example. Alternatively, the workpiece holder 302 can be moved 309m (e.g., moved up and down) by a machine connected with the holder 302 or manually by hand, for example. A thermocouple or other type of temperature sensor can be inserted 320 through the nipple 308 or the stopper 304 to monitor the temperature of the solution 310. The solution 310 can also be circulated, filled, or removed via the nipple 308 using tubing or the like connected with a pump, for example. A solution for rinsing off the immersion platinum plating solution 310 can also be dispensed into the flask 301 via the nipple 308 or the neck 306. Configuration 300 can be used in jewelry shop, a laboratory, a machine shop, or other environment where immersion plating platinum on a large or small number of articles is desirable.

Although FIGS. 2 and 3 depict articles submerged in the immersion platinum plating solution (210, 310), the present invention is not limited to submerged articles. Any process, machinery, technique, or the like operative to place or position the solution and the article into contact with each other and then breaking the contact between the solution and article can be used. The immersion platinum plating solution can be applied to the structure to be plated in a variety of ways including but not limited to spraying the solution on the article(s), applying the solution to the article(s) as a vapor or mist, repeatedly dipping the article(s) in the solution, flowing the solution over the article(s), applying the solution as the article(s) are spun (e.g., as in spin deposition application on a semiconductor wafer), connecting the article(s) to be immersion plated with a moving structure such as a conveyor belt or the like and passing the moving structure through a tank or bath that contains the solution, just to name a few.

Further, in FIGS. 2 and 3, the process (299 and 399) of immersion plating platinum (Pt) onto the metal surfaces of the workpieces (212, 325, 327) does not require electricity, does not require electrodes as in conventional electroplating, and does not require a reducing agent as in conventional electroless plating.

Although several embodiments of an apparatus and a method of the present invention have been disclosed and illustrated herein, the invention is not limited to the specific forms or arrangements of parts so described and illustrated. The invention is only limited by the claims.

What is claimed is:

1. An immersion plating platinum solution free of a reducing agent, comprising:
    a platinum source having a molar concentration of between 1 mM and 50 mM; and
    a complexing agent including Oxalic Acid having a molar concentration that is between 1× and 100× the molar concentration of the platinum source;
    an inhibitor; and
    an accelerator.

2. The immersion platinum plating solution of claim 1, wherein the inhibitor comprises benzotriazole (BTA).

3. The immersion platinum plating solution of claim 2, wherein the BTA has a concentration of between 10 mg/L and 100 mg/L.

4. The immersion platinum plating solution of claim 1, wherein the accelerator comprises hydroxylamine ($NH_2OH$—$HCl$).

5. The immersion platinum plating solution of claim 1, wherein the accelerator has a molar concentration that is between 1× and 20× a molar concentration of the platinum source.

6. The immersion platinum plating solution of claim 1 and further comprising:
    a buffer agent;
    a surfactant; and
    an anti-oxidant.

7. The immersion platinum plating solution of claim 6, wherein the buffer agent comprises ammonium chloride ($NH_4Cl$).

8. The immersion platinum plating solution of claim 6, wherein the anti-oxidant comprises riboflavin (vitamin B2).

9. The immersion platinum plating solution of claim 6, wherein the anti-oxidant comprises ascorbic acid.

10. The immersion platinum plating solution of claim 6, wherein the anti-oxidant has a molar concentration that is between 1× and 20× a molar concentration of the platinum source.

11. An immersion plating platinum solution free of a reducing agent, comprising:
    a platinum source; a complexing agent including Oxalic Acid; a buffer agent; a surfactant; an anti-oxidant; an inhibitor; and an accelerator;
    wherein the surfactant comprises a nonionic surfactant.

12. The immersion platinum plating solution of claim 11, wherein the nonionic surfactant has a concentration of between 10 ppm and 100 ppm.

13. An immersion plating platinum solution free of a reducing agent, comprising:
    a Pt (II) platinum source having a molar concentration of between 1 mM and 50 mM;
    Oxalic Acid as a complexing agent having a molar concentration that is between 1× and 100× the molar concentration of the Pt (II) platinum source;
    an inhibitor; and
    an accelerator having a molar concentration that is between 1× and 20× the molar concentration of the Pt (II) platinum source.

* * * * *